United States Patent
Calpito et al.

(10) Patent No.: US 12,315,957 B2
(45) Date of Patent: May 27, 2025

(54) MULTI-AXIS ULTRASONIC WEDGE WIRE BONDING

(71) Applicant: Atieva, Inc., Newark, CA (US)

(72) Inventors: Dodgiereigh M. Calpito, Fairfield, CA (US); Brandon Weber, Maricopa, AZ (US); Jean-Philippe Gauthier, San Francisco, CA (US); James Hawkins, Fremont, CA (US)

(73) Assignee: Atieva, Inc., Newark, CA (US)

( * ) Notice: Subject to any disclaimer, the term of this patent is extended or adjusted under 35 U.S.C. 154(b) by 127 days.

(21) Appl. No.: 17/449,729

(22) Filed: Oct. 1, 2021

(65) Prior Publication Data

US 2023/0107681 A1  Apr. 6, 2023

(51) Int. Cl.
*H01M 50/516* (2021.01)
*B23K 20/10* (2006.01)
(Continued)

(52) U.S. Cl.
CPC ........... *H01M 50/516* (2021.01); *B23K 20/10* (2013.01); *H01M 10/0525* (2013.01);
(Continued)

(58) Field of Classification Search
CPC ............. H01M 50/516; H01M 50/503; H01M 10/425; H01M 50/505; H01M 50/51; H01M 50/514; H01M 50/528
See application file for complete search history.

(56) References Cited

U.S. PATENT DOCUMENTS 5,663,012 A * 9/1997 Shannon ............. H01M 50/514
439/825
6,244,498 B1  6/2001 Jiang et al.
(Continued)

FOREIGN PATENT DOCUMENTS

CN   111615770 A  * 9/2020  ............... B60K 1/04
DE   102013203280 A1   8/2014
(Continued)

OTHER PUBLICATIONS

International Search Report and Written Opinion for PCT Application No. PCT/US2022/077331, mailed on Dec. 23, 2022, 13 pages.
(Continued)

*Primary Examiner* — Imran Akram
(74) *Attorney, Agent, or Firm* — Brake Hughes Bellermann LLP

(57) ABSTRACT

In a general aspect, an electrical device assembly (e.g., a battery module) can include a first electrical contact surface, a second electrical contact surface, and a ribbon wire extending along a longitudinal axis. The ribbon wire can include a first portion, a second portion and a third portion. The first portion of the ribbon wire can be coupled with the first electrical contact surface via a first wedge bond. The second portion of the ribbon wire can be coupled with the second electrical contact surface via a second wedge bond. The third portion of the ribbon wire can extend between the first portion and the second portion. The first portion can have a first width transverse to the longitudinal axis of the ribbon wire, and the third portion can have a second width transverse to the longitudinal axis, the first width being greater than the second width.

13 Claims, 4 Drawing Sheets

(51) Int. Cl.
*H01M 10/0525* (2010.01)
*H01M 50/503* (2021.01)
*H01M 50/505* (2021.01)
*H01M 50/522* (2021.01)
*H01M 50/528* (2021.01)
*B23K 101/36* (2006.01)

(52) U.S. Cl.
CPC ....... H01M 50/505 (2021.01); H01M 50/522 (2021.01); H01M 50/528 (2021.01); B23K 2101/36 (2018.08)

(56) References Cited

U.S. PATENT DOCUMENTS

| | | | |
|---|---|---|---|
| 6,367,685 B1 | 4/2002 | Jiang et al. | |
| 8,033,875 B1* | 10/2011 | Maguire | H01R 4/38 439/762 |
| 8,091,762 B1* | 1/2012 | Cheng | B23K 20/004 228/180.5 |
| 2008/0241667 A1* | 10/2008 | Kohn | B60L 3/04 429/159 |
| 2011/0147953 A1* | 6/2011 | Haba | H01L 23/49861 257/784 |
| 2014/0178743 A1* | 6/2014 | Delepierre | H01M 10/0525 29/623.2 |
| 2015/0140409 A1* | 5/2015 | Sakurai | H01M 50/569 429/179 |
| 2015/0364740 A1 | 12/2015 | De Arroyabe et al. | |
| 2016/0141585 A1 | 5/2016 | Berg et al. | |
| 2016/0164063 A1 | 6/2016 | Angerbauer et al. | |
| 2017/0133725 A1 | 5/2017 | Schwindt et al. | |
| 2018/0117714 A1* | 5/2018 | Scherer | B23K 31/025 |
| 2019/0044120 A1* | 2/2019 | Ota | H01R 25/162 |
| 2019/0044123 A1* | 2/2019 | Nishimura | H01M 50/507 |
| 2019/0058282 A1* | 2/2019 | Fukushima | H01R 13/60 |
| 2019/0109313 A1* | 4/2019 | Ryu | H01M 10/0422 |
| 2019/0131609 A1* | 5/2019 | Fukushima | H01M 50/505 |
| 2020/0395589 A1* | 12/2020 | Yasuda | H01M 50/519 |
| 2022/0021081 A1* | 1/2022 | Trif | H01M 50/507 |
| 2022/0059883 A1* | 2/2022 | Kuroda | H01M 50/249 |
| 2022/0328925 A1* | 10/2022 | Kuboki | H01G 11/10 |
| 2022/0344783 A1* | 10/2022 | Sunaga | H01M 50/516 |
| 2023/0102692 A1* | 3/2023 | Ahn | H01M 50/271 429/123 |
| 2023/0102771 A1* | 3/2023 | Calpito | H01M 50/503 429/158 |

FOREIGN PATENT DOCUMENTS

| | | | | |
|---|---|---|---|---|
| DE | 102013213524 A1 | 1/2015 | | |
| DE | 102013213527 A1 | 1/2015 | | |
| DE | 102014212247 A1 | 12/2015 | | |
| WO | WO-2016157262 A1 * | 10/2016 | | H01M 2/1077 |
| WO | WO-2017008947 A1 * | 1/2017 | | B23K 20/1265 |
| WO | WO-2020255876 A1 * | 12/2020 | | H01M 50/249 |

OTHER PUBLICATIONS

J. Tsujino et al.: "Configurations of Large Capacity Ultrasonic Complex Vibration Sources with Complex Transverse Vibration Rods and a Disk with Multiple Transducers," JSME International Journal, Series C, vol. 49, No. 3, 2006, pp. 695-702.

* cited by examiner

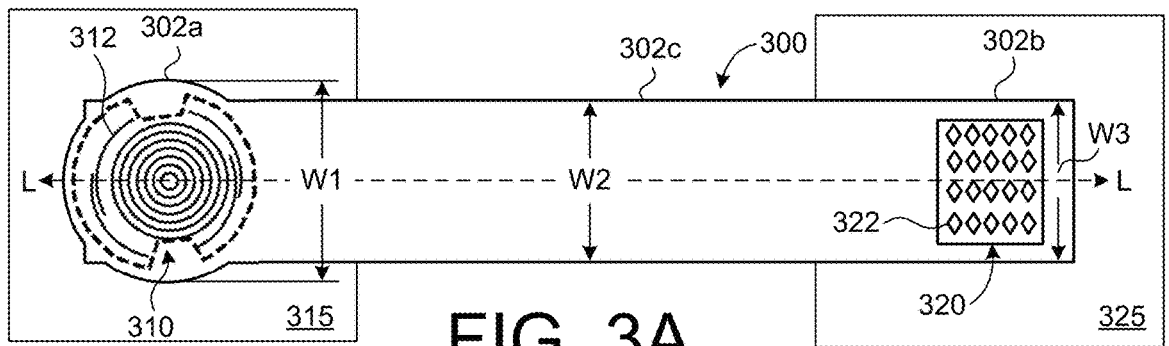
FIG. 3A
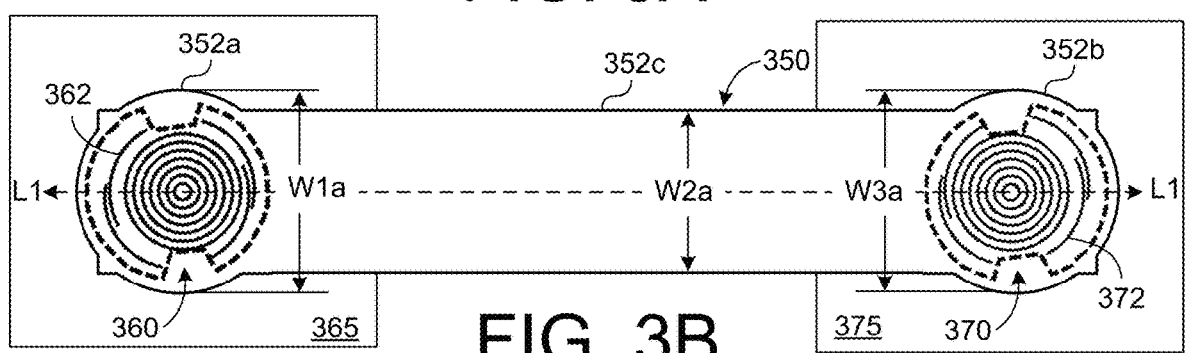
FIG. 3B
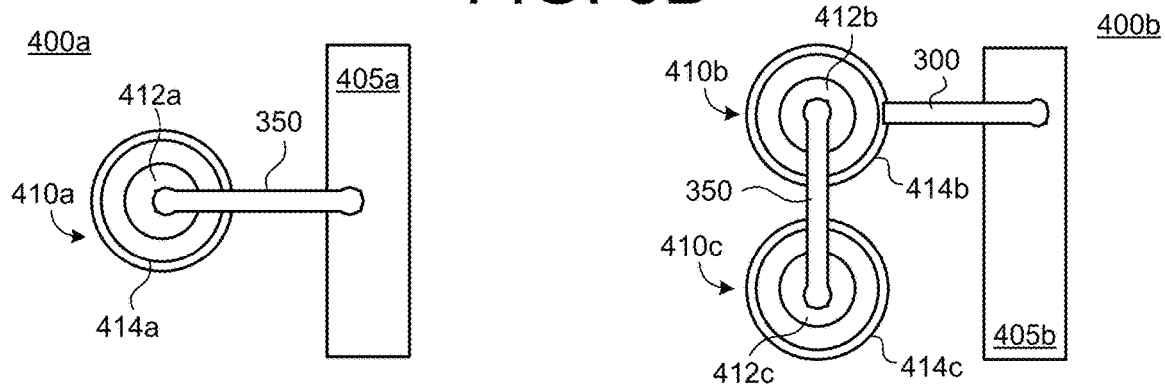
FIG. 4A
FIG. 4B
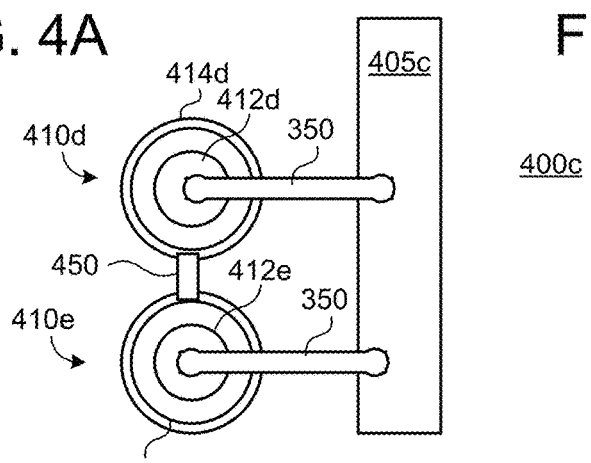
FIG. 4C

MULTI-AXIS ULTRASONIC WEDGE WIRE BONDING

TECHNICAL FIELD

This document relates to wedge wire bonding.

BACKGROUND

In recent years, the world has begun a transition away from using power primarily obtained from fossil fuels and toward more sustainable energy sources. One area where this change occurs involves the use of electric motors powered by on-board energy storages in vehicles. Vehicle makers are striving to increase efficiency and utility of such vehicles, including the performance of energy storages such as battery packs, which includes improving the quality of wedge wire bonds used to electrically interconnect components of such battery packs, such as terminals of electrochemical cells and busbars.

SUMMARY

In a general aspect, an electrical device assembly (e.g., a battery module) can include a first electrical contact surface, a second electrical contact surface, and a ribbon wire extending along a longitudinal axis. The ribbon wire can include a first portion that is coupled with the first electrical contact surface via a first wedge bond. The ribbon wire can also include a second portion that is coupled with the second electrical contact surface via a second wedge bond. The ribbon wire can further include a third portion extending between the first portion and the second portion. The first portion of the ribbon wire can have a first width transverse to the longitudinal axis of the ribbon wire, and the third portion of the ribbon wire having a second width transverse to the longitudinal axis, the first width being greater than the second width.

Implementations can include one or more of the following features. For example, the second portion of the ribbon wire has a third width transverse to the longitudinal axis of the ribbon wire, the third width being approximately equal to the second width.

The second portion of the ribbon wire can have a third width transverse to the longitudinal axis of the ribbon wire, the third width being approximately equal to the first width.

Intermetallics of the first wedge bond on the first electrical contact surface can be, at least in part, circular. Intermetallics of the second wedge bond on the second electrical contact surface can be, at least in part, circular.

The first electrical contact surface and the second electrical contact surface can each be respectively included in one of a busbar of a battery module, or in a terminal located at an end of an electrochemical cell of the battery module. The terminal of the electrochemical cell can include one of a rim or a cap of the electrochemical cell. The ribbon wire can include a copper ribbon wire.

In another general aspect, an electrical device assembly (e.g., a battery module) can include an electrical contact surface, and a ribbon wire including a portion that is coupled with the electrical contact surface via a wedge bond. Intermetallics of the wedge bond on the electrical contact surface can define, at least in part, concentric circular patterns.

Implementations can include one or more of the following features. For example, the portion of the ribbon wire can be a first portion of the ribbon wire. The ribbon wire can extend along a longitudinal axis. The ribbon wire can include a second portion forming a wire loop. The first portion of the ribbon wire and the second portion of the ribbon wire can be electrically continuous. The first portion of the ribbon wire can have a first width transverse to the longitudinal axis of the ribbon wire. The second portion of the ribbon wire can have a second width transverse to the longitudinal axis of the ribbon wire, the first width being greater than the second width.

The electrical contact surface can be included in one of a busbar of a battery module, or in a terminal located at an end of an electrochemical cell of the battery module. The terminal of the electrochemical cell can include one of a rim or a cap of the electrochemical cell. The ribbon wire can include a copper ribbon wire.

In another general aspect, a method can include feeding a ribbon wire through a wedge bonder head, and positioning the wedge bonder head over an electrical contact surface, the electrical contact surface being arranged in a plane. The method can further include lowering the wedge bonder head, such that a first surface of the ribbon wire is in contact with the electrical contact surface and such that a wedge of the wedge bonder head is in contact with a second surface of the ribbon wire opposite the first surface of the ribbon wire. The method can also include forming a wedge bond between the ribbon wire and the electrical contact surface. Forming the wedge bond can include activating an ultrasonic transducer of the wedge bonder head with the wedge in contact with the ribbon wire, and rotating the wedge bonder head with the wedge in contact with the ribbon wire.

Implementations can include one or more of the following features. For example, activating the ultrasonic transducer can include activating the ultrasonic transducer when rotating the wedge bonder head.

Activating the ultrasonic transducer can include activating a plurality of ultrasonic transducers. A first ultrasonic transducer of the plurality of ultrasonic transducers can have an ultrasonic vibration axis that is parallel to the plane of the electrical contact surface, and a second ultrasonic transducer can have an ultrasonic vibration axis that is perpendicular to the plane of the electrical contact surface. A third ultrasonic transducer of the plurality of ultrasonic transducers can have an ultrasonic vibration axis that is parallel to the plane of the electrical contact surface and perpendicular to the ultrasonic vibration axis of the first ultrasonic transducer.

A first ultrasonic transducer of the plurality of ultrasonic transducers can have an ultrasonic vibration axis that is parallel to the plane of the electrical contact surface, and a second ultrasonic transducer of the plurality of ultrasonic transducers can have an ultrasonic vibration axis that is parallel to the plane of the electrical contact surface and non-parallel with the ultrasonic vibration axis of the first ultrasonic transducer. A third ultrasonic transducer of the plurality of ultrasonic transducers can have an ultrasonic vibration axis that is perpendicular to the plane of the electrical contact surface.

A first ultrasonic transducer of the plurality of ultrasonic transducers can have an ultrasonic vibration axis that is parallel to the plane of the electrical contact surface, and a second ultrasonic transducer of the plurality of ultrasonic transducers can have an ultrasonic vibration axis that is parallel to the plane of the electrical contact surface and parallel with the ultrasonic vibration axis of the first ultrasonic transducer. A third ultrasonic transducer of the plurality of ultrasonic transducers can have an ultrasonic vibration axis that is perpendicular to the plane of the electrical contact surface.

BRIEF DESCRIPTION OF DRAWINGS

FIGS. 3A-3B are diagrams schematically illustrating example wedge bonded ribbon wires including wedge bonds formed using multi-axis ultrasonic wedge bonding.

FIGS. 4A-4C are diagrams schematically illustrating example battery modules that include wedge bonded ribbon wires having wedge wire bonds formed using multi-axis ultrasonic wedge bonding implemented in respective battery modules.

Like reference symbols in the various drawings indicate like elements.

DETAILED DESCRIPTION

Figure 1:
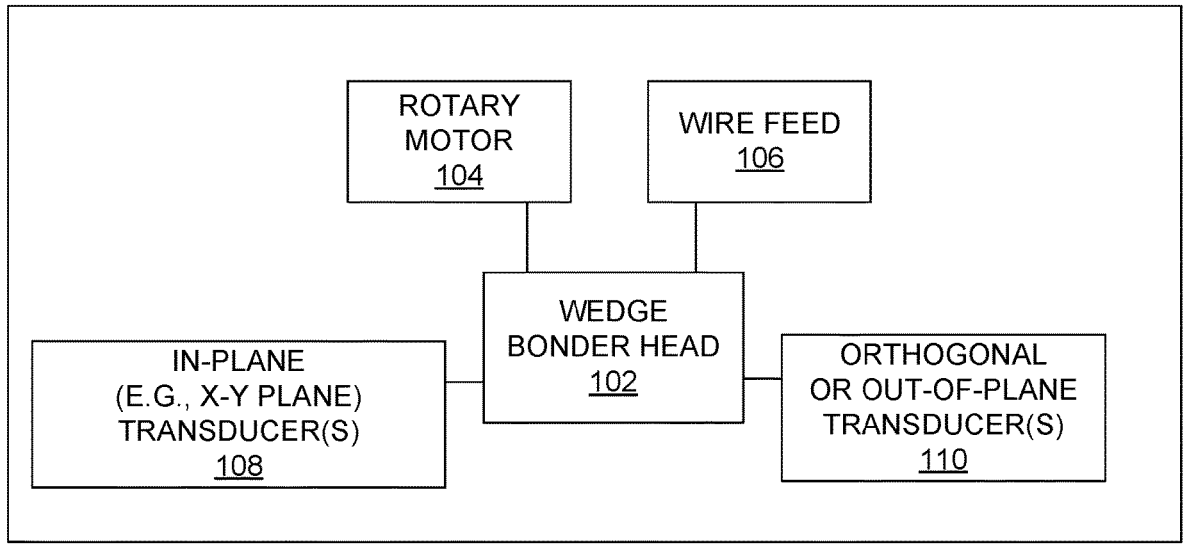
FIG. 1 is a block diagram illustrating an example wedge wire bonder.

This document describes examples of systems and techniques directed to formation of a wedge wire bond using ultrasonic vibration along multiple axes, which can be referred to as multi-axis ultrasonic wedge bonding, or wedge bonding using multi-axis ultrasonics. In some implementations, forming a wedge wire bond can include, during formation of the bond, rotating a wire bonder head in conjunction with (e.g., contemporaneously with) activation of one or more ultrasonic transducers included in the wire bonder head. The subject matter described herein can improve the performance of corresponding electrical device assemblies, such as battery modules. For example, electrical interconnects to individual electrical contact surfaces (e.g., terminals of electrochemical cells and/or busbars of a battery module) can be provided with increased conductivity as a result of electrical resistance of associated wedge wire bonds being reduced. Such reduced resistance can be achieved as a result of increased bond area and/or due to improved adherence of bond wire material to a corresponding electrical contact surface, such as a busbar or a terminal of an electrochemical cell of a battery module. Stated another way, wedge wire bonds formed using the approaches described herein can have larger bond (e.g., contact) areas, and/or lower resistance per unit area than wedge wire bonds formed using current approaches.

Examples herein refer to forming wedge wire bonds using multi-axis ultrasonics to adhere, or ultrasonically weld a bond wire (e.g., a ribbon wire) to a corresponding electrical contact surface. As used herein, multi-axis ultrasonics can include in-plane ultrasonics and/or out-of-plane ultrasonics. In-plane ultrasonics can be implemented by ultrasonic transducers with vibration axes that are parallel with, and/or in-plane with an electrical contact surface on which a wedge wire bond is formed. Out-of-plane ultrasonics can be implemented by ultrasonic transducers with vibration axes that are non-parallel with (e.g., perpendicular to, or at a non-zero angle with) an electrical contact surface on which a corresponding wedge wire bond is formed. In example implementations, ultrasonic transducers with vibration frequencies in a range of 40 kHz and 160 kHz can be used.

Examples herein refer to bond wires (e.g., ribbon wires) that extend along respective longitudinal axes. As used herein, a bond wire can have any number of different geometries, can include one or more materials having respective conductivities. For instance, a bond wire can be a multi-layered bond wire that has a plurality of layer each having a respective conductivity. In some implementations, a bond wire can be a ribbon wire having a rectangular cross-section and having one or more layers, which can include one or more conductive materials, such as copper, aluminum, alloys of copper, alloys of aluminum, etc. As used herein, a longitudinal axis of a bond wire can be defined as being a mid-line of the bond wire that extends along a length of the bond wire. For instance, when a give bond wire is in a flat and linear configuration, its longitudinal axis, or mid-line will be a straight line. However, when the bond wire is in a non-flat and/or non-linear configuration (e.g., a curved or arced) configuration, the longitudinal axis, or mid-line will conform to the configuration or shape of the bond wire and, therefore, may not be situated along a straight line.

Examples herein refer to intermetallics of wedge bonds that are, at least in part, circular. As used herein, intermetallics are metallic compounds that are formed as a result of ultrasonic scrubbing of a bond wire on an electrical contact surface. As used herein, circular means curved in shape and can include concentric curved or circular patterns, partial curved or circular patterns, and so forth that can be observed on an upper surface of a bond wire in a wire bond and/or observed in intermetallics formed between a bond wire and a corresponding, underlying electrical contact surface. Accordingly, such intermetallics can be intermetallics having patterns on an electrical contact surface that are, at least in part, circular or curved in shape.

Examples herein refer to wire loops. As used herein, a wire loop is a portion of a ribbon wire that extends between two wedge wire bonds. For instance, a wire loop can electrically connect a first wedge wire bond and its corresponding electrical contact surface with a second wedge wire bond and it corresponding electrical contact surface. In implementations, a wire loop can be flat, curved, arced, or a combination thereof.

Examples herein refer to electrochemical cells. As used herein, an electrochemical cell is a device that generates electrical energy from chemical reactions, or uses electrical energy to cause chemical reactions, or both. An electrochemical cell can include an electrolyte and two electrodes to store energy and deliver it when used. In some implementations, the electrochemical cell can be a rechargeable cell. For example, the electrochemical cell can be a lithium-ion cell. In some implementations, the electrochemical cell can act as a galvanic cell when being discharged, and as an electrolytic cell when being charged. The electrochemical cell can have at least one terminal for each of the electrodes. The terminals, or at least a portion thereof, can be positioned at one end of the electrolytic cell. For example, when the electrochemical cell has a cylindrical shape, one of the terminals can be provided in the center of the end of the cell, and the can that forms the cylinder can constitute the other terminal and therefore be present at the end as well. Other shapes of electrochemical cells can be used, including, but not limited to, prismatic shapes.

Examples herein refer to a battery module, which is an individual component configured for holding and managing multiple electrochemical cells during charging, storage, and use. The battery module can be intended as the sole power source for one or more loads (e.g., electric motors), or more than one battery module of the same or different type can be used. Two or more battery modules can be implemented in a system separately or as part of a larger energy storage unit. For example, a battery pack can include two or more battery modules of the same or different type. A battery module can include control circuitry for managing the charging, storage, and/or use of electrical energy in the electrochemical cells, or the battery module can be controlled by an external component. For example, a battery management system can be implemented on one or more circuit boards (e.g., a printed circuit board).

Examples herein refer to a busbar, where a corresponding battery module can have at least one busbar. The busbar is electrically conductive and is used for conducting electricity to the electrochemical cells when charging, or from the cells when discharging. The busbar is made of an electrically conductive material (e.g., metal) and has suitable dimensions considering the characteristics of the electrochemical cells and the intended use. In some implementations, the busbar comprises aluminum (e.g., an aluminum alloy). A busbar can be planar (e.g., flat) or can have one or more bends, depending on the shape and intended use of the battery module.

Examples herein may refer to a top or a bottom. These and similar expressions identify things or aspects in a relative way based on an express or arbitrary notion of perspective. That is, these terms are illustrative only, used for purposes of explanation, and do not necessarily indicate the only possible position, direction, and so on.

FIG. 1 is a block diagram illustrating an example wedge wire bonder (wire bonder) 100. The wire bonder 100 can be used to form wedge wire bonds using multi-axis ultrasonics, such as using the approaches described herein. Wire bonder 100 is given by way of example, and wire bonders having other configurations can be used to form wedge wire bonds using multi-axis ultrasonics in accordance with the present disclosure. As shown in FIG. 1, the wire bonder 100 includes a wedge bonder head 102, a rotary motor 104, a wire feed (or wire supply) device 106, one or more in-plane (e.g., X-Y plane) ultrasonic transducers 108, and one or more orthogonal or out-of-plane (e.g., Z-axis) ultrasonic transducers 110.

In this example, the rotary motor 104 can be used to rotate the wedge bonder head 102 both during formation of wedge wire bonds, as well as to orient the bonder to move between bonding sites, e.g., to properly feed the ribbon wire to form interconnecting wire loops between wedge wire bonds. In example implementations, the rotary motor 104 can be a stepper motor, a servo motor, and/or other motor for which an angle of rotation can be controlled, such as by a programable control device, such as a microprocessor or microcontroller. For instance, the rotary motor 104 can selectably (e.g., programmably) rotate in a clockwise direction and/or a counter-clockwise direction, such as shown, for example, in FIG. 2. The wire feed 106 of the wire bonder 100 can supply wire, e.g., ribbon wire from a wire spool supply, through the wire guide of the wedge bonder head 102, such that the wire is fed under the wedge to position the wire for formation of a wedge bond.

In the example wire bonder 100, the one or more in-plane transducers 108 can be included in, or coupled with the wedge bonder head 102, so as to provide ultrasonic vibration of the wedge of the wedge bonder head 102 along respective axes that are parallel with, or in-plane with a plane defined by an electrical contact surface on which a wedge wire bond is being formed. The one or more orthogonal or out-of-plane transducers 110 can also be included in, or coupled with the wedge bonder head 102. In comparison to the one more in-plane transducers 108, the one or more orthogonal, or out-of-plane transducers 110 can provide ultrasonic vibration along respective axes that are non-parallel with the plane of an electrical contact surface on which a wedge bond is being formed, such as axes that are orthogonal to, or at non-zero angles with the plane of the electrical contact surface.

Figure 2:
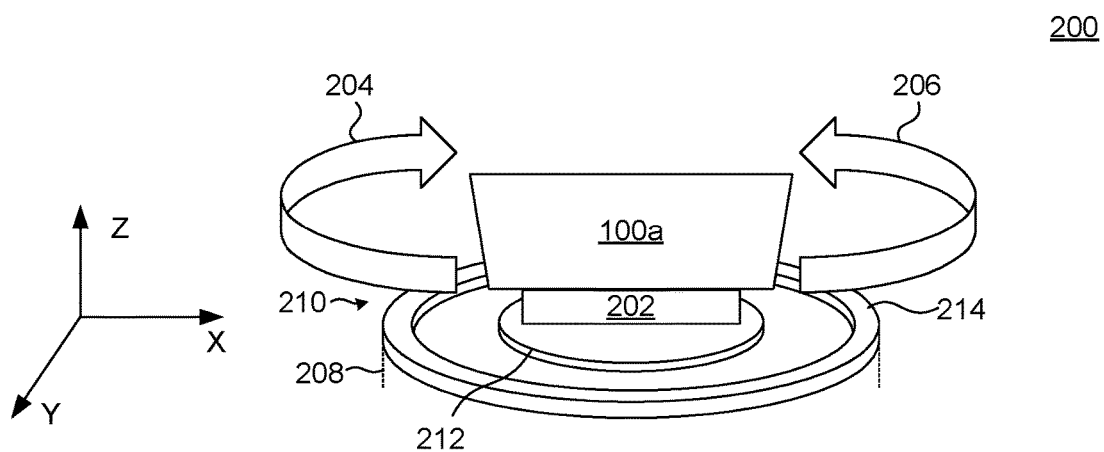
FIG. 2 is a diagram illustrating an example of formation of a wire bond using multi-axis ultrasonic wedge bonding, such as using the wedge wire bonder illustrated in FIG. 1.

FIG. 2 is a diagram illustrating an example of a wire bond operation 200 for formation of a wedge wire bond using multi-axis ultrasonics, such as using the wedge wire bonder 100 illustrated in FIG. 1. Accordingly, FIG. 2, for purposes of example and illustration, will be described with further reference to FIG. 1. However, in some implementations, wire bonders having other configurations can be used to form wedge wire bonds using multi-axis ultrasonics. In this example, a wedge of the wire bonder 100 is schematically shown in FIG. 2 as wedge 100a. FIG. 2 also illustrates a ribbon bond wire (ribbon wire, or wire) 202, which is shown in a side view from an end of the ribbon wire 202, and a portion of a electrochemical cell 210 that can be included in a battery module. X, Y and Z axes are also shown in FIG. 2 for reference in the discussion of the bonding operation 200. Also shown in FIG. 2 are arrows 204 and 206 indicating, respectively, clockwise rotation of the wedge 100a (or associated wedge bonder head) and counterclockwise rotation of the wedge 100a.

In example implementations, the ribbon wire 202 can be shaped (e.g., as a result of forming wire bonds and associated wire loops) to be suitable for its intended use of forming electrical connection between separate electric contact surfaces, which can also be referred to as conductive surfaces. That is, in some implementations, the ribbon wire 202 can be used to form an electrical connection between separate conductive surfaces with a wedge wire bond on at least one of the conductive surfaces being formed using multi-axis ultrasonics. In implementations, the conductive surfaces can be substantially parallel to each other (e.g., co-planar or in parallel planes), or the conductive surfaces can be oriented in different directions. As another example, the conductive surfaces can be positioned at substantially a same level relative to a reference level (e.g., co-planar), or the conductive surfaces can be positioned at different levels relative to the reference level (e.g., non-co-planar).

In some implementations, the shape of the ribbon bond wire 202 can result from the process by which the ribbon wire 202 is installed to electrically connect the associated conductive surfaces. For example, the ribbon wire 202 can initially be kept as stock material on a spool, and a suitable length of the ribbon wire 202 can be installed to form an electrical connection between two or more conductive surfaces, thereby assuming a shape suitable for connecting those surfaces, e.g., such as including an appropriate wire loop (or wire loops) between respective wedge bonds formed on the conductive surfaces. Depending on the particular implementation, the ribbon wire 202 can include copper, aluminum, a copper alloy, an aluminum alloy, and/or a combination thereof. In some implementations, the ribbon wire 202 can be a multi-layered ribbon wire that includes layers of different material that are bonded to each other (e.g., laminated, swaged, adhesive attached, etc.).

In the example of FIG. 2, the bonding operation 200 involves electrically bonding the ribbon wire 202 to a portion of an electrochemical cell 208 of a battery module. Here, only an end 210 of the electrochemical cell 208 is shown for simplicity. In some implementations, the end 210 can be referred to as a top of the electrochemical cell 208. For example, the electrochemical cell 208 can include a can (not shown) to hold active materials, and the end 210 can be formed by a cap that seals an opening of the can.

The electrochemical cell 208 can have multiple terminals. Here, a terminal 212 is shown as a structure positioned at a center of the end 210. For example, the terminal 212 can be a positive terminal of the electrochemical cell 208. Here, a rim 214 included in the end 210 is at least a part of another terminal of the electrochemical cell 208. For example, the rim 214 (and a remainder of the can material, including a bottom of the can) may serve as a negative terminal of the electrochemical cell 208. In such approaches, the terminal 212 and the rim 214 can be electrically insulated from one another.

The bonding operation 200 can include use of one or more tools. In some implementations, such as those described herein, a wire bonding head can be used, such as the wedge bonder head 102 of the wire bonder 100 (FIG. 1). As noted above, the wire bonding head can include the wedge 100a. The wedge 100a can be used to bond the ribbon wire 200 to the terminal 212, or the rim 214. In this example, formation of a wedge wire bond to the terminal 212 is illustrated. In implementations, the wedge 100a can be made of metal. In some implementations, the wedge 100a (e.g., using the one or more in-plane transducers 108 and/or the one or more out-of-plane transducers 110, as shown in FIG. 1) can apply multi-axis ultrasonic vibrations to the ribbon wire 202, such that the ribbon wire 202 bonds (e.g., ultrasonically welds to form intermetallics) with material of the terminal 212. For example, the terminal 212 can include steel or another metal.

In some implementations, the ribbon wire 202 can be wedge bonded to the rim 214 of the electrochemical cell 208. In such implementations, the ribbon wire can have any appropriate orientation relative to the rim 214. For instance, in some implementations, the orientation of the ribbon wire 202 (e.g., a longitudinal axis or mid-line of the ribbon wire 202) can be substantially radial relative to the rim 214. In other implementations, the ribbon wire 202 can be oriented substantially in a tangential direction relative to the rim 214. In still other implementations, other orientations of the ribbon wire 202 relative to the rim 214 can be used.

As shown in FIG. 2, in this example, a bottom (first) surface of the ribbon wire 202 is in contact with the terminal 212, while the wedge 100a of the wedge bonder head 102 is in contact with a top (second) surface of the ribbon wire 202, with wedge 100a applying an appropriate amount of pressure, e.g., along the Y-axis, to the ribbon wire 202. The amount of pressure applied to the ribbon wire 202 by the wedge 100a will depend on the particular implementation.

In the bonding operation 200 shown in FIG. 2, with the first surface of the ribbon wire 202 in contact with the terminal 212, and with the wedge 100a in contact with the second surface of the ribbon wire 202, the one or more in-plane transducers 108 (FIG. 1) and/or the one or more out-of-plane transducers 110 (FIG. 1) can be activated. Further in the bonding operation 200, while the one or more in-plane transducers 108 and/or the one or more out-of-plane transducers 110 (FIG. 1) are activated, the wedge 100a (e.g., along with the corresponding wedge bonder head 102 of FIG. 1) can be rotated, using the rotary motor 104 (FIG. 1), clockwise, as indicated by the arrow 204, and/or can be rotated counter-clockwise, as indicated by the arrow 206.

In such an approach the one or more in-plane transducers 108 (FIG. 1) can provide ultrasonic vibration of the wedge 100a in the X-Y plane indicated by the reference X-Y-Z axes in FIG. 2 (e.g., parallel to, or in plane with the surface of the terminal 214). Further, in such implementations, the one or more out-of-plane transducers 110 (FIG. 1) can provide ultrasonic vibration of the wedge 100a along the Z-axis (e.g., perpendicular to the surface of the terminal 214), or along an axis that is at a non-zero angle (e.g., not parallel) with the surface of the terminal 214.

In some implementations, the wedge 100a can be rotated while the one or more in-plane transducers 108 and/or the one or more out-of-plane transducers 110 (FIG. 1) are activated. In other implementations, the one or more in-plane transducers 108 and/or the one or more out-of-plane transducers 110 can be activated with the wedge 100a in a first position, then deactivated while with wedge 100a is rotated and still in contact with the ribbon wire 202 as shown in FIG. 2, and then reactivated with the wedge 100a in a second, rotated position. This process can then be repeated for additional positions of the wedge 100a. In still other implementations, the one or more in-plane transducers 108 and/or the one or more out-of-plane transducers 110 can be activated and deactivated in sequence, either while the wedge 100a is being rotated, and/or while the wedge 100a is stationary in different positions. The particular combination of rotation of the wedge 100a and activation of the one or more in-plane transducers 108 and/or the one or more out-of-plane transducers 110 will depend on the particular implementation.

FIGS. 3A and 3B are diagrams schematically illustrating example wedge bonded ribbon wires including wedge bonds formed using multi-axis ultrasonics in accordance with the present disclosure. For clarity and simplicity, corresponding, underlying electrical contact surfaces on which the wedge bonds of FIGS. 3A and 3B can be formed are not shown in FIGS. 3A and 3B. As described herein, such electrical contact surfaces can be respectively part of (e.g., included in) a busbar, or part of a terminal or an electrochemical cell. In other implementations, wedge bonds formed with multi-axis ultrasonics using the approaches described herein can be formed with other electrical contact surfaces.

Referring to FIG. 3A, a ribbon wire 300 is illustrated, where the ribbon wire 300 includes a portion 302a, a portion 302b and a portion 302c. As shown in FIG. 3A, the ribbon wire 300 can generally extend along a longitudinal axis L. In the example of FIG. 3A, the portion 302a of the ribbon wire 300 can be coupled with a corresponding, underlying conductive surface 315 with a wedge bond 310, while the portion 302b can be coupled with a corresponding, underlying conductive surface 320 with a wedge bond 320 (e.g., such as in an arrangement similar to the ribbon wire 206 and the terminal 212 in FIG. 2). In the example of FIG. 3A, the wedge bond 310 of the portion 302a is formed using the approaches described herein for forming wedge bonds using multi-axis ultrasonics, including rotation of a wire bonding wedge. In contrast, the wedge bond 320 of the portion 302b is formed without rotation of a wire bonding wedge. In some implementations, both in-plane and out-of-plane transducers can be used to form the wedge bond 320.

In the example of FIG. 3A, intermetallics 312 (e.g., a pattern of intermetallics formed between the ribbon wire 300 and a corresponding conductive surface) of the wedge bond 310 are schematically illustrated. The dashed line of the wedge bond 310, as illustrated in FIG. 3A, can indicate an outer perimeter of the wedge bond 310. As shown in FIG. 3A, the intermetallics 312 are, at least in part, circular. That is, the intermetallics 312 formed between the first portion 302 of the ribbon wire 300 and the corresponding conductive surface can be formed in circular or curved shapes, such as concentric circular shapes, as shown. Such circularly shaped intermetallics can result, at least in part, from teeth of a wire bonding wedge, as the wedge is rotated while in contact with the portion 302a of the ribbon wire 300.

In comparison with the wedge bond 310, the wedge bond 320 can include intermetallics 322 that correspond with a pattern of teeth on a wire bonding wedge used to form the wedge bonds 310 and 320, where such teeth interface (engage, etc.) with the ribbon wire 300 to hold it in place during the wire bonding operation. As shown in FIG. 3A, the intermetallics 322, in this example, are diamond shaped. In other implementations, other shapes can be used, such as circles, squares, triangles, stars, etc.

The portion 302c of the ribbon wire 300 can form a wire loop between the portion 302a and the portion 302b. That is, the portion 302c of the ribbon wire can extend between (electrically connect) the wedge bond 310 and the wedge bond 320, as well as electrically connect their corresponding electrical contact surfaces.

As shown in FIG. 3A, the portion 302a of the ribbon wire 300 can have a first width W1 transverse to the longitudinal axis L, while the portion 302c of the ribbon wire 300 can have a second with W2 transverse to the longitudinal axis L. In this example, the first width W1, due to spreading of the ribbon wire material during formation of the wedge bond 310, is greater than the second width W2. As further shown in FIG. 3A, the portion 302b of the ribbon wire 300 can have a third width W3 transverse to the longitudinal axis L, where the third width W3 is substantially, approximately or about equal to the second width W2 of the portion 302c.

Referring to FIG. 3B, a ribbon wire 350 is illustrated, where the ribbon wire includes a portion 352a, as portion 352b and a portion 352c. Similar to the ribbon wire 300, the ribbon wire 350 can extend along a longitudinal axis L1. In the example of FIG. 3B, the portion 352a of the ribbon wire 300 is illustrated as being coupled with a corresponding conductive surface with a wedge bond 360, while the portion 352b is illustrated as being coupled with a corresponding conductive surface with a wedge bond 370. In the example of FIG. 3B, both the wedge bonds 360 and 370 are formed using the approaches described herein for forming wedge bonds using multi-axis ultrasonics, including rotation of a wire bonding wedge. Accordingly, the wedge bonds 360 and 370 are illustrated as having respective intermetallics 362 and 372 that are, at least in part, circular or curved in shaped, such as those described above with respect to the wedge bond 310 of FIG. 3A.

In the example of FIG. 3B, the portion 352c of the ribbon wire 350 can form a wire loop between the portion 352a and the portion 352b. That is, the portion 352c of the ribbon wire 350 can extend between (electrically connect) the wedge bond 360 and the wedge bond 370, as well as electrically connect their corresponding electrical contact surfaces.

As shown in FIG. 3B, the portion 352a of the ribbon wire 350 can have a first width W1a transverse to the longitudinal axis L1, the portion 352c of the ribbon wire 350 can have a second width W2a transverse to the longitudinal axis L1, and the portion 352b can have a third with W3a transverse to the longitudinal axis L1. In this example, the first width W1a and the third width W3a, due to spreading of the ribbon wire material during formation of the wedge bonds 360 and 370, are both greater than the second width W2a. In this example, the first width W1a and the third width W3a can be substantially equal.

FIGS. 4A-4C are diagrams schematically illustrating, respectively, example battery modules 400a, 400b and 400c (e.g., portions of battery modules) including wedge bonded ribbon wires having wedge bonds formed using multi-axis ultrasonics. For simplicity in illustrating the examples of FIGS. 4A-4C, bond wires having similar configurations as the bond wire 300 of FIG. 3A or the bond wire 350 of FIG. 3B are referenced with the same respective reference numbers. It will be appreciated that this notation is being used merely for purposes of illustration, and the arrangement of a given ribbon wire (e.g., its length, its orientation with respect to a corresponding contact surface, etc.) and its associated wedge bonds will depend on the particular implementation. Further, the bond wire connections illustrated in FIGS. 4A-4C are given by way of example, and other connections can be formed using bond wires have other configurations and wedge bonds.

Referring to FIG. 4A, the battery module 400a includes a busbar 405a and an electrochemical cell 410a. The electrochemical cell 410a includes a terminal 412a and a rim 414a. As shown in FIG. 4A, the busbar 405a is electrically coupled with the terminal 412a via a ribbon wire 350 (such as shown in FIG. 3B) and its associated wedge bonds.

Referring to FIG. 4B, the battery module 400b includes a busbar 405b, an electrochemical cell 410b, and an electrochemical cell 410c. The electrochemical cell 410b includes a terminal 412b and a rim 414b, while the electrochemical cell 410c includes a terminal 412c and a rim 414c. As shown in FIG. 4B, the busbar 405b is electrically coupled with the rim 414b of the electrochemical cell 410b via a ribbon wire 300 (such as shown in FIG. 3A), where a wedge bond consistent with the wedge bond 310 is formed on the busbar 405b and a wedge bond consistent with the wedge bond 320 is formed on the rim 414b. In other implementations, a ribbon wire 350, such as shown in FIG. 3B, could be used to electrically couple the busbar 405b with the rim 414b. As also shown in FIG. 4B, the terminal 412b of the electrochemical cell 410b is electrically coupled with the terminal 412c of the electrochemical cell 410c via a ribbon wire 350 (such as shown in FIG. 3B) and its associated wedge bonds.

Referring to FIG. 4C, the battery module 400c includes a busbar 405c, an electrochemical cell 410d, and an electrochemical cell 410d. The electrochemical cell 410d includes a terminal 412d and a rim 414d, while the electrochemical cell 410e includes a terminal 412e and a rim 414e. As shown in FIG. 4B, the busbar 405b is electrically coupled with the terminal 412d of the electrochemical cell 410d and the terminal 412e of the electrochemical cell 410e via respective ribbon wires 350 (such as shown in FIG. 3B) and their associated wedge bonds. As further shown in FIG. 4C, the rim 414d of the electrochemical cell 410d is electrically coupled with the rim 414e of the electrochemical cell 410e via a ribbon wire 450, where the ribbon wire 450 can be wedge bonded to the rims 414d and 414e using wedge bonds such as the wedge bond 320 shown in FIG. 3A. In other implementations, a ribbon wire 300 or a ribbon wire 350, such as shown, respectively, in FIGS. 3A and 3B, could be used to electrically couple the rim 414d with the rim 414e.

Figure 5:
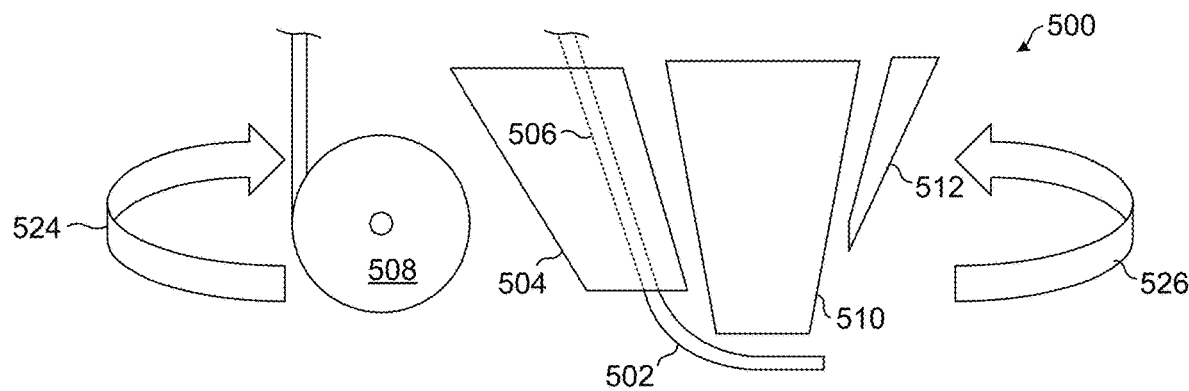
FIG. 5 is a diagram illustrating an example wedge bonder head for forming wedge wire bonds using multi-axis ultrasonic wedge bonding.

FIG. 5 is a diagram illustrating an example wedge bonder head 500 for forming wedge wire bonds with a ribbon wire 502 using multi-axis ultrasonics in accordance with the approaches described herein. The wire bonder head 500 and/or the ribbon wire 502 can be used with one or more other examples described elsewhere herein. The wire bonder head 500 includes a wire guide 504. The wire guide 504 is used for guiding (e.g., feeding) the ribbon wire 502 during a bonding operation. The wire guide 504 can be made of one or more materials, including, but not limited to, a metal or a synthetic material. A supply 506 of the ribbon bond wire 502 is illustrated as passing through the wire guide 504. In some implementations, the supply 506 of the ribbon wire 502 can be provided from a spool 508. For example, the spool 508 can be rotatably suspended in relation to the wire bonder head 500 so as to allow the supply 506 of the ribbon wire 502 to be obtained in a continuous or intermittent fashion, and such that the ribbon wire 502 has a particular orientation relative to, e.g., an electrochemical cell, busbar, or other electrical contact surface for bonding.

The wire bonder head 500 includes a wedge 510. The wedge 510 can be used to bond the ribbon bond wire 502 to an electrical contact surface (not shown), such as the electrical contact surfaces described herein. In an example implementation, the wedge 510 can be made of metal.

The wire bonder head 500 also includes a cutter 512. The cutter 512 can be used to sever the ribbon wire 502 before, during, or after bonding. For example, the cutter 512 can be made of metal.

As also shown by the arrows 524 and 526 in FIG. 5, the wire bonder head 500 can rotate, respectively, in a clockwise direction and/or a counter-clockwise direction. Such rotation can be performed using a rotary motor, such as the rotary motor 104 described with respect to FIG. 1. Rotation of the wire bonder head 500 can be performed while forming a wedge bond, such as the wedge bonds 310, 360 and 370 as shown in FIGS. 3A and 3B.

Figure 6:
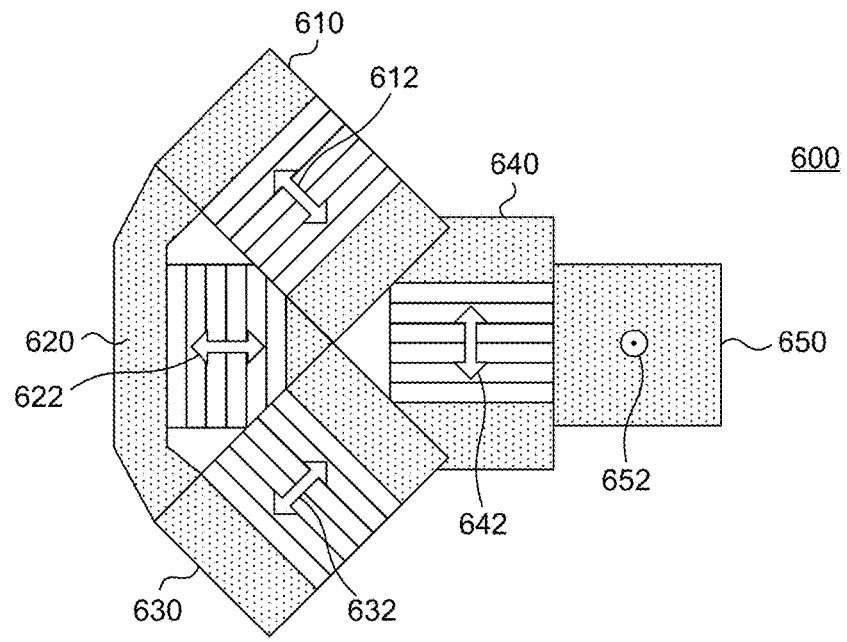
FIG. 6 is a diagram schematically illustrating example ultrasonic transducer arrangement.

FIG. 6 is a diagram schematically illustrating an example arrangement 600 of a plurality ultrasonic transducers that can be implement multi-axis ultrasonic vibration in a wedge wire bonder, such as the wedge wire bonders described herein. As shown in FIG. 6, the arrangement 600 can be implemented using a plurality of ultrasonic transducers 610, 620, 630, 640 and 650. As shown in FIG. 6, the transducers 610-650 can operate with respective ultrasonic axes 612, 622, 632, 642 and 652. In the example of FIG. 6, the transducers 610, 620, 630 and 640 can be referred to as in-plane transducers, such as the one or more in-plane transducers 108 of FIG. 1. That is, their respective ultrasonic axes of vibration 612, 622, 632 and 642 are arranged in, or parallel to, a plane of an electrical contact surface on which a corresponding wedge bond is being formed (e.g., the X-Y plane as described with respect to FIG. 2).

Further in the example of FIG. 6, the transducer 650 can be referred to as an out-of-plane (e.g., orthogonal) transducer, such as the one or more out-of-plane transducers 110 of FIG. 1. That is, the ultrasonic axis of vibration 652 is perpendicular to (in and out of the page), or at a non-zero angle with an electrical contact surface on which a corresponding wedge bond is being formed (e.g., along the Z axis as described with respect to FIG. 2).

While FIG. 6 shows a particular configuration of ultrasonic transducers, other configurations and/or variations are possible. For instance, each ultrasonic transducer of FIG. 6 can include multiple transducers. In some implementation, fewer or additional ultrasonic transducers could be used. For instance, in an example implementation, the transducers 610 and 630 could be omitted, resulting in perpendicular ultrasonic axes 622 and 642 of the transducers 620 and 640 being implemented in-plane, and the ultrasonic axis 653 of the transducer 650 being implemented out-of-plane.

Figure 7:
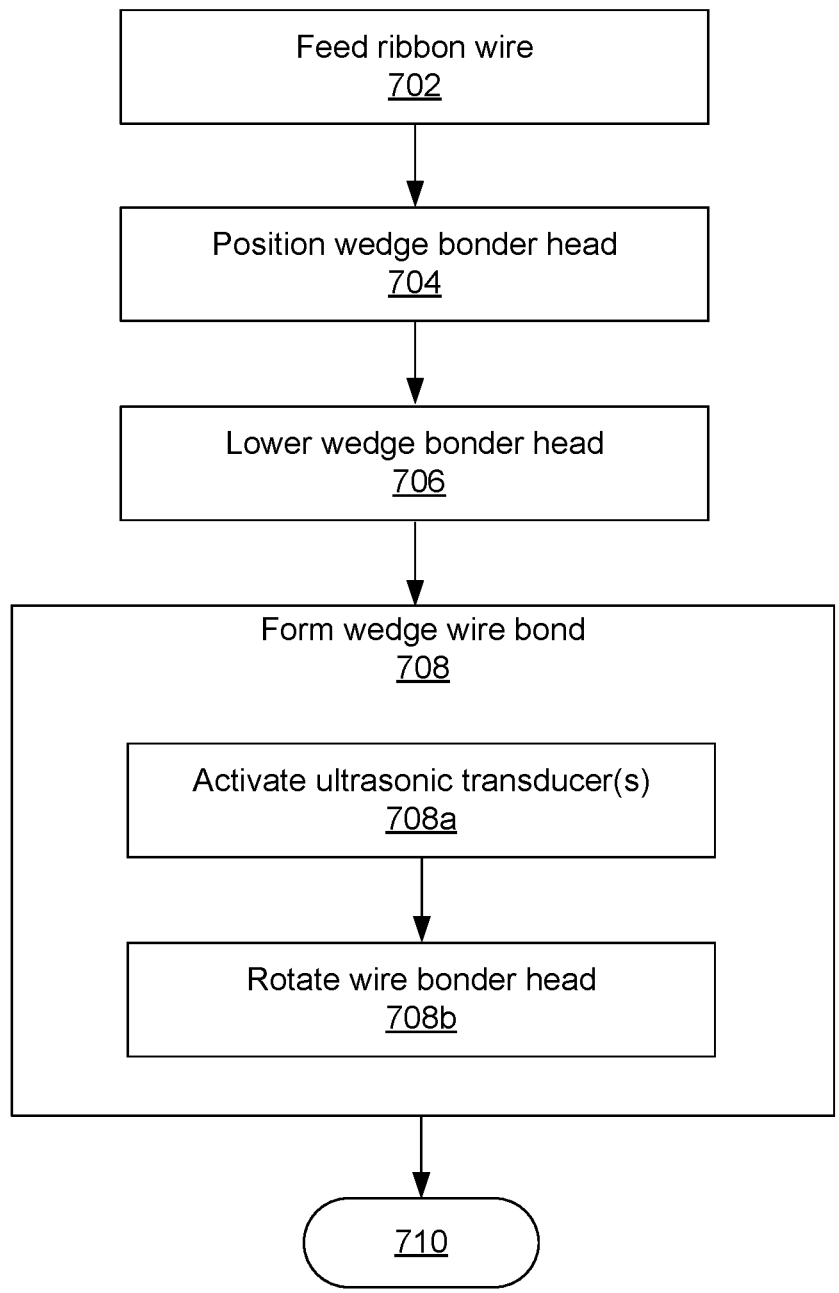
FIG. 7 is flowchart illustrating an example method.

FIG. 7 shows an example of a method 700. The method 700 can be used with one or more other examples described elsewhere herein. More or fewer operations than shown can be performed. Two or more operations can be performed in a different order unless otherwise indicated. For purpose of illustration, the method 700 will be described with further reference to at least FIGS. 1, 2 and 5. In some implementations, the method 700 can be implemented using wedge wire bonding tools having other configurations.

At operation 702, the method 700 can include feeding a ribbon wire through the wire guide 504 (FIG. 5), so as to feed the ribbon wire under a bonding wedge, such as the wedge 510 (FIG. 5), of a wedge bonder head. At operation 704, the method 700 includes positioning the wedge bonder head over an electrical contact surface on which a wedge bond is to be formed with multi-axis ultrasonics, where the electrical contact surface is arranged in a plane (e.g., the X-Y plane of FIG. 2). At operation 706, the method includes lowering the wedge bonder head, such that a first surface of the ribbon wire is in contact with the electrical contact surface, and such that a wedge of the wedge bonder head is in contact with a second surface of the ribbon wire opposite the first surface of the ribbon wire. Such an arrangement is illustrated, for example, in FIG. 2.

At operation 708, the method 700 includes forming a wedge wire bond between the ribbon wire and the electrical contact surface with multi-axis ultrasonics, include rotation of a wedge bonder head during formation of the wedge bond. Forming the wedge bond of the method 700 includes: at operation 708a, activating an ultrasonic transducer of the wedge bonder head with the wedge in contact with the ribbon wire and, at operation 708b, rotating the wedge bonder head with the wedge in contact with the second (upper) surface of the ribbon wire.

In some implementations, activating the ultrasonic transducer at operation 708a can include activating the ultrasonic transducer when rotating the wedge bonder head. Further, in some implementations, activating the ultrasonic transducer at operation 708a can include activating a plurality of ultrasonic transducers. In an implementation, a first ultrasonic transducer of the plurality of ultrasonic transducers can have an ultrasonic vibration axis that is parallel to the plane of the electrical contact surface, and a second ultrasonic transducer can have an ultrasonic vibration axis that is perpendicular to the plane of the electrical contact surface. Further in this example, a third ultrasonic transducer of the plurality of ultrasonic transducers can have an ultrasonic vibration axis that is parallel to the plane of the electrical contact surface and perpendicular to the ultrasonic vibration axis of the first ultrasonic transducer.

In another implementation, a first ultrasonic transducer of the plurality of ultrasonic transducers can have an ultrasonic vibration axis that is parallel to the plane of the electrical contact surface, and a second ultrasonic transducer of the plurality of ultrasonic transducers can have an ultrasonic vibration axis that is parallel to the plane of the electrical contact surface and non-parallel with the ultrasonic vibration axis of the first ultrasonic transducer. Further, in this example, a third ultrasonic transducer of the plurality of ultrasonic transducers can have an ultrasonic vibration axis that is perpendicular to the plane of the electrical contact surface.

In yet another implementation, a first ultrasonic transducer of the plurality of ultrasonic transducers can have an ultrasonic vibration axis that is parallel to the plane of the electrical contact surface, and a second ultrasonic transducer of the plurality of ultrasonic transducers can have an ultrasonic vibration axis that is parallel to the plane of the electrical contact surface and parallel with the ultrasonic vibration axis of the first ultrasonic transducer. In such an implementation, multi-axis ultrasonics can be achieved as a result of rotation of an associated wedge bonder head, and corresponding rotation of the ultrasonic vibration axes of the first and second transducers. Further in this example, a third ultrasonic transducer of the plurality of ultrasonic transducers can have an ultrasonic vibration axis that is perpendicular to the plane of the electrical contact surface.

At operation 710, zero, one or more operations can be performed. In some implementations, the method 700 can end at operation 710, e.g. after performing the operations 702-708b. In some implementations, some or all of the operations 702-708b can be performed at the operation(s) 710 regarding forming another electrical connection between same or different electrical contact surfaces, or forming a wire loop (e.g., operations 702 and 704) between wedge wire bonds, e.g., such as discussed with respect to the ribbon wires 300 and 350 of FIGS. 3A and 3B. In some implementations, another type of interconnect can be formed, which can be an additionally formed wedge wire bond to a same electrochemical cell and/or busbar of the operations 702-708b, or to another electrochemical cell and/or busbar.

The terms "substantially", "about" and "approximately" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An electrical device assembly comprising:
   a first electrical contact surface;
   a second electrical contact surface; and
   a bond wire electrical connection including:
   a ribbon wire extending along a longitudinal axis;
   a first ultrasonic wedge bond that couples a first portion of the ribbon wire with the first electrical contact surface;
   a second ultrasonic wedge bond that couples a second portion of the ribbon wire with the second electrical contact surface; and
   a wire loop including a third portion of the ribbon wire that extends between the first portion of the ribbon wire and the second portion of the ribbon wire, the wire loop being curved or arced,
   the first portion of the ribbon wire having a first width transverse to the longitudinal axis of the ribbon wire,
   the second portion of the ribbon wire having a second width transverse to the longitudinal axis of the ribbon wire, and
   the third portion of the ribbon wire having a third width transverse to the longitudinal axis, the first width being greater than the third width, and the second width being greater than the third width.

2. The electrical device assembly of claim 1, wherein the third width is approximately equal to the first width.

3. The electrical device assembly of claim 1, wherein intermetallics of the first ultrasonic wedge bond on the first electrical contact surface are, at least in part, circular.

4. The electrical device assembly of claim 3, wherein intermetallics of the second ultrasonic wedge bond on the second electrical contact surface are, at least in part, circular.

5. The electrical device assembly of claim 1, wherein the first electrical contact surface and the second electrical contact surface are each respectively included in one of a busbar of a battery module, or in a terminal located at an end of an electrochemical cell of the battery module.

6. The electrical device assembly of claim 5, wherein the terminal of the electrochemical cell includes one of a rim or a cap of the electrochemical cell.

7. The electrical device assembly of claim 1, wherein the ribbon wire includes a copper ribbon wire.

8. An electrical device assembly comprising:
   an electrical contact surface; and
   a bond wire electrical connection including:
   a ribbon wire;
   an ultrasonic wedge bond that couples a first portion of the ribbon wire with the electrical contact surface; and
   a wire loop including a second portion of the ribbon wire extending from the first portion of the ribbon wire, the wire loop being curved or arced,
   wherein intermetallics of the ultrasonic wedge bond on the electrical contact surface define a pattern including concentric circles.

9. The electrical device assembly of claim 8, wherein:
   the ribbon wire extends along a longitudinal axis;
   the first portion of the ribbon wire and the second portion of the ribbon wire are electrically continuous;
   the first portion of the ribbon wire has a first width transverse to the longitudinal axis of the ribbon wire; and
   the second portion of the ribbon wire has a second width transverse to the longitudinal axis of the ribbon wire, the first width being greater than the second width.

10. The electrical device assembly of claim 8, wherein the electrical contact surface is included in one of a busbar of a battery module, or in a terminal located at an end of an electrochemical cell of the battery module.

11. The electrical device assembly of claim 10, wherein the terminal of the electrochemical cell includes one of a rim or a cap of the electrochemical cell.

12. The electrical device assembly of claim 8, wherein the ribbon wire includes a copper ribbon wire.

13. The electrical device assembly of claim 8, wherein:
the first portion of the ribbon wire has a first width transverse to a longitudinal axis of the ribbon wire; and
the second portion of the ribbon wire has a second width transverse to the longitudinal axis of the ribbon wire, the first width being greater than the second width.

\* \* \* \* \*